Feb. 23, 1965

S. M. JANIKOWSKI ETAL 3,170,761

PROCESS FOR THE PRODUCTION OF PHOSPHORIC
ACID AND APPARATUS THEREFOR

Filed Nov. 13, 1961

INVENTORS
Stanislaw Maria Janikowski
William Francis Sheldrick by Wenderoth, Lind & Ponack Attorneys 3,170,761
PROCESS FOR THE PRODUCTION OF PHOSPHOR-
IC ACID AND APPARATUS THEREFOR
Stanislaw Maria Janikowski and William Francis Sheld-
 rick, Felixstowe, England, assignors to Fisons Fertilizers
 Limited, Felixstowe, Suffolk, England, a British
 company
Filed Nov. 13, 1961, Ser. No. 151,749
Claims priority, application Great Britain, Nov. 18, 1960,
39,638/60
5 Claims. (Cl. 23—165)

The present invention relates to an improved method and apparatus for carrying out chemical processes.

In many processes it is desirable to carry out the process in a continuous manner in a series of vessels in order to achieve the desired conversion. It may also be desirable in a multi-vessel system to recycle part of the reacted or reacting mass to the starting vessel of the system. This is particularly so in the case of reactions involving slurries when the recycle of slurry within the system may inter alia, improve crystallization, increase the fluidity of the re- actants, dilute the ingoing reactants to a preferred level of concentration, facilitate heat removal from the system.

It has now been found that such reactions can be carried out in a highly efficient manner in a reaction vessel which is divided into at least 3 separate compartments in the manner hereinafter described.

Accordingly the present invention is for an apparatus which comprises a vessel which is divided into at least three separate compartments by one or more partitions, said compartments communicating in series for example by means of ports, weirs, pipes or channels, at least two of said compartments communicating with a draft tube adapted to move fluid from one compartment to another.

The separate compartments into which the vessel is divided are essentially separate from one another, apart from the communicating ports. In operation the feed is added to the compartment first in the series and flows through the other compartments to the last compartment in the series where the fluid is passed through a port into the draft tube and returned to the first compartment. The product offtake may be at any suitable point.

The draft tube is provided with appropriate impelling means to cause the fluid to flow from the last compartment in the series into the first compartment through the draft tube.

The vessel may be of any shape and size, but usually it is more convenient for this to be cylindrical. The draft tube may be arranged in any position in the vessel, but it is usually found more convenient for this to be arranged vertically and/or for this to be arranged in the centre of the vessel. The partitions forming the compartments in the vessel may be disposed equidistant from one another, or may be arranged at differing distances from one an- other so as to provide compartments of varying size. This may be desirable for certain reactions where an extended residence time may be required at one stage of the process. According to one preferred embodiment of the invention the first compartment in the series is larger than the subsequent compartments.

The communicating means from one compartment to another in series in the vessel may comprise ports of any position in the partition wall or an overflow at the top of the partition dividing one compartment from the other or other suitable means.

The draft tube is suitably provided with an impeller, such as a propeller, turbine or paddle or with intermediate properties between these three, which impels the fluid in an upward or downward direction. The recirculation rate through the system varies with impeller speed. Con- sequently the processes employing the apparatus are ex- tremely flexible as the recirculation rates may be readily varied over a wide range. It has been discovered that the single compartmented vessel does not require high fluid heads to recirculate fluid through the system so that very high recirculation rates can be achieved with lower power requirements than a series of vessels employing an ex- ternal pump. The absence of glands and bearings under the liquid level in the proposed system results in lower maintenance costs than are required for an external pump- ing system.

Although the draft tube is the most suitable method for achieving internal recirculation in the system, other means may also be used to provide internal recirculation. Thus in place of a draft tube and impeller, recirculation may be achieved by suitable positioning of the agitators or by adjusting the power input to the agitators in the com- partments. This can result in a pressure difference which causes fluid flow between interconnected compartments.

Accordingly one embodiment of the invention is for an apparatus which comprises a vessel which is divided into at least three separate compartments by partitions, said compartments communicating in series, the last compart- ment being adjacent to the first, and each of said com- partments being provided with agitators, wherein the re- circulation means from the last compartment to the first compartment in the series comprises a suitably positioned impeller to ensure positive flow through the communi- cating means connecting said compartments.

The number of compartments employed in the vessel may comprise three or more, for example three to twenty compartments, and it has been found particularly suitable to employ from three to six compartments. In operation using the embodiment with a draft tube it is not essential to recirculate through all compartments in the system and in some cases it may be beneficial to maintain one or more compartments without recirculation. The outlet may be suitably from such a compartment.

It has been found that the reactor volumetric efficiency is much higher in a vessel divided into a number of dis- crete compartments with no intermixing in accordance with the invention as compared with a single vessel with or without a draft tube.

In accordance with the invention it is possible to simu- late a stirred tank reactor system with recycle containing any number or combination of vessel sizes without any requirement for an external pumping system, and there- fore it is possible to carry out such processes more con- veniently and in a more economic manner.

The apparatus according to the present invention may be used for many reactions. Among the suitable reactions which may be mentioned include the production of a com- plex fertilizer by the acidulation of phosphate rock with nitric acid and treatment with a soluble sulphate such as potassium sulphate, ammonium sulphate or sulphuric acid in which calcium sulphate is crystallized and removed by filtration.

The apparatus according to the present invention is particularly suited to the manufacture of phosphoric acid by the wet process, i.e. from sulphuric acid and phosphate rock.

Accordingly therefore one embodiment of the invention is for the apparatus as described used in the manufacture of phosphoric acid.

It has been found particularly advantageous in the man- ufacture of phosphoric acid for the first compartment to be larger than the subsequent compartments. Desirably the volume of each of the subsequent compartments is 20–70% of the volume of the first compartment in the series; the volume of each of the subsequent compart- ments may be for example 40–60% of the volume of the first compartment in the series. Preferably the volume of the first compartment is double the volume of each of the subsequent compartments.

A further embodiment is for a process for the manufacture of phosphoric acid from sulphuric acid and phosphate rock which comprises the steps of adding phosphate rock to the first compartment of a vessel divided into at least three compartments communicating in series, adding sulphuric acid to a different compartment in the series, circulating the reaction mixture with agitation through said compartments, recirculating part of the reaction mixture from the last compartment to the first compartment in the recirculation series, withdrawing part of the reaction mixture from one compartment, suitably the last compartment, in the series, the holding time in the first compartment being greater than the holding time in the subsequent compartments.

It has been found suitable for the holding time in the first compartment to be 1.5 to 5 times the holding time in the subsequent compartments; suitably the holding time in the first compartment is double the holding time in the subsequent compartments.

Solely by way of illustration embodiments of the invention are illustrated in the accompanying drawings.

Figure 1:
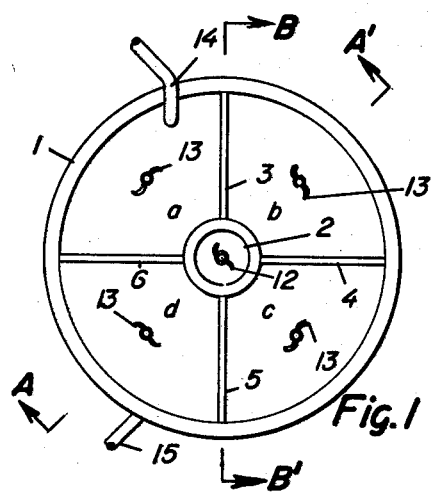
FIGURE 1 is a top view of one reactor system according to the invention.
Figure 2:
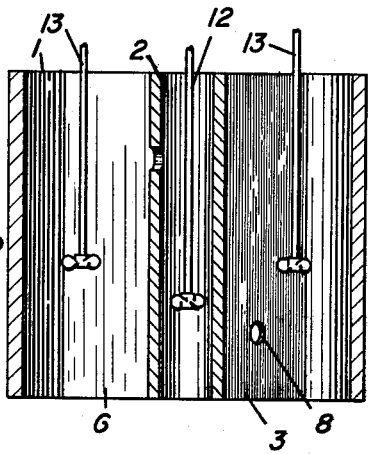
FIGURE 2 is a cross-sectional view along line AA' in FIGURE 1.
Figure 3:
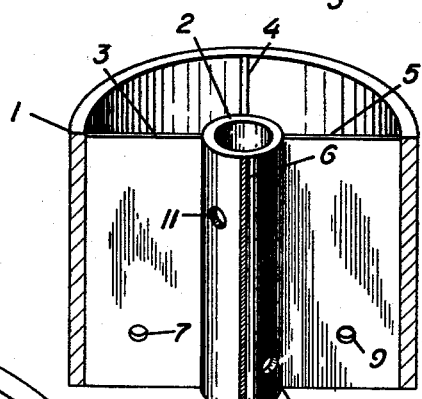
FIGURE 3 is a partial cross-sectional-/perspective view along line BB' in FIGURE 1.
Figure 4:
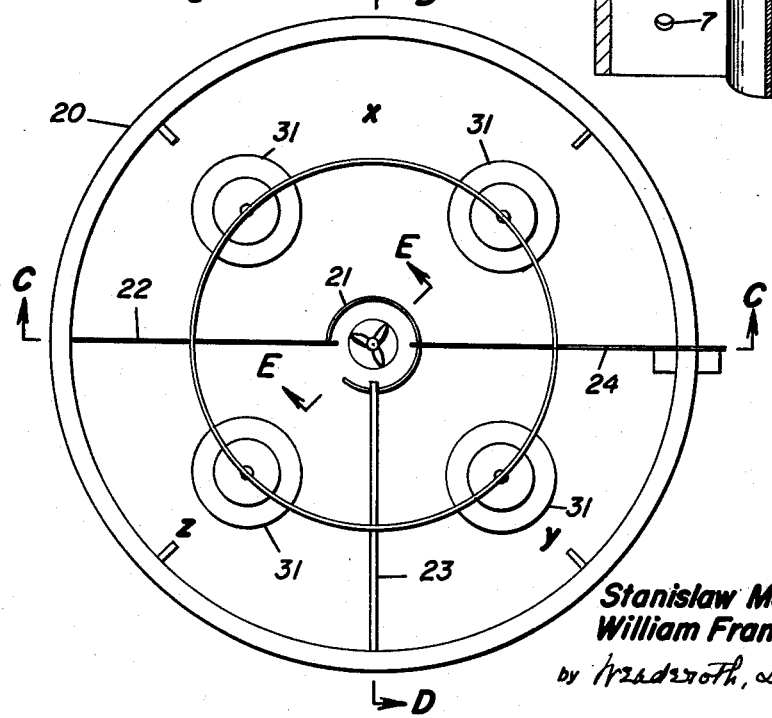
FIGURE 4 is a top view of another reactor system according to the invention.
Figure 5:
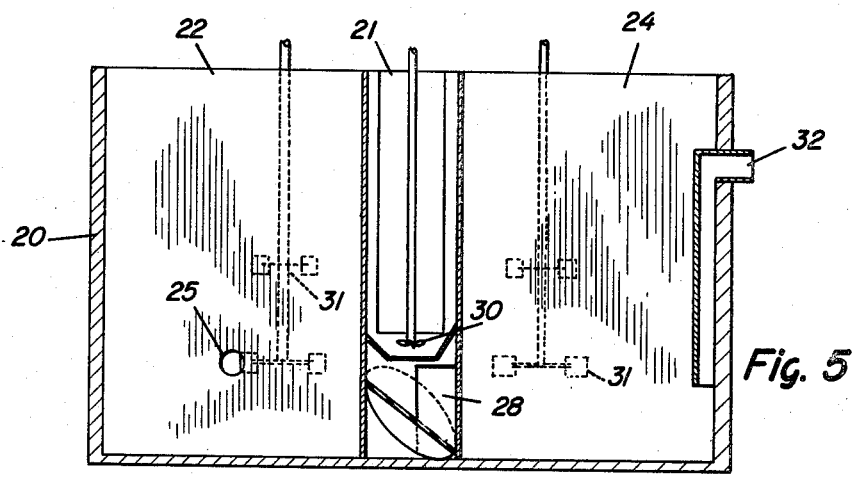
FIGURE 5 is a cross-sectional view along line CC' in FIGURE 4.
Figure 6:
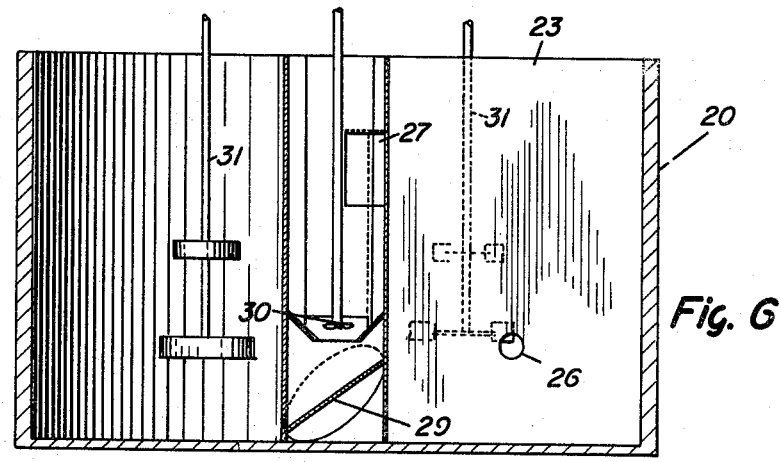
FIGURE 6 is a cross-sectional view along line DD' in FIGURE 4.
Figure 7:
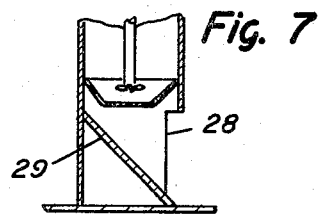
FIGURE 7 is a cross-sectional view along line EE' in FIGURE 4.

The apparatus shown in FIGURES 1, 2 and 3 comprises the cylindrical vessel 1 which is provided with the central draft tube 2 and partition walls 3, 4, 5 and 6, which divide the vessel into the compartments "a," "b," "c," and "d." The partition walls 3, 4, and 5 are provided with communicating ports 7, 8 and 9 respectively, the apparatus being arranged with compartment "a", as the first vessel in the series and compartment "d" as the last vessel in the series.

Compartment "d" is provided with port 10 into the draft tube 2 and compartment "a" is similary provided with port 11 from the draft tube. The draft tube is provided with an impeller agitator 12 which moves fluid in an upward direction, and each of the compartments a, b, c and d is provided with a stirrer 13.

A feed line 14 introduces feed into compartment "a," and product removal line 15 removes product from compartment "d."

In conducting the process the reactants are introduced into compartment "a," and then flow through port 7 into compartment "b," from there through port 8 into compartment "c" and from there through port 9 into compartment "d." From compartment "d" the liquid is drawn into the draft tube 2 through port 10 and is impelled up this tube and ejected through port 11 into compartment "a."

The rate of recirculation is determined by the speed of the impeller 12 and may be readily adjusted.

For convenience this apparatus has been illustrated with four compartments, but the apparatus may be constructed with any number of compartments.

If desired for example this apparatus may be rearranged simply to provide for a compartment without recirculation, by providing an outlet port from compartment "c" into the draft tube 2, and closing outlet port 10. Compartment "d" will then be outside the recirculation system.

The apparatus shown in FIGURES 4, 5, 6 and 7 comprises the cylindrical vessel 20, which is provided with the central draft tube 21 and partition walls 22, 23, and 24, which divide the vessel into reactors "x," "y," and "z." Reactor "x" is semicircular in cross-section and comprises half the vessel. The partition walls 22 and 23 are provided with communicating ports 25 and 26 respectively. Reactor "z" is provided with an outlet port 27 in the upper part of the draft tube 21, and an inlet port 28 provided with angled base plate 29 into reactor "x" is provided in the lower part of the draft tube 21. The draft tube 21 is provided with an impeller 30 which moves fluid in a downward direction, and each of reactors "x," "y," and "z" is provided with its own stirring means 31. Product removal line 32 is provided in reactor "z."

In operation the reactants are introduced into compartment x; if desired part of the reactants may be introduced through the draft tube 21. The reaction mixture flows from reactor "x" through port 25 into reactor "y," and from there through port 26 into reactor "z." From reactor "z" the reaction mixture is drawn into the draft tube 21 through outlet port 27 and impelled downwards and ejected through port 28 into reactor "x." The angled base plate reflects the flow into reactor "x," ensuring efficient mixing.

In the case of phosphoric acid manufacture by the wet process, it is necessary for the sulphuric acid to be diluted before coming into contact with the phosphate rock. This is most conveniently achieved by introducing the phosphate rock and sulphuric acid into different compartments. Thus in FIGURE 1, only phosphate rock would be introduced into compartment "a"; sulphuric acid would be introduced into another compartment, for example "b," "c" or "d." Similarly in FIGURE 4, only phosphate rock would be introduced into compartment "x"; sulphuric acid would be introduced into another compartment, for example "y" or "z."

If desired other appropriate means may be adopted to ensure the adequate dilution of the sulphuric acid; for example this may be added to the draft tube.

The wet process for the manufacture of phosphoric acid is loosely referred to as the manufacture of phosphoric acid from sulphuric acid and phosphate. In fact the rock is simultaneously attacked by recycle phosphoric acid and sulphuric acid, and the reaction may be represented by the following formula:

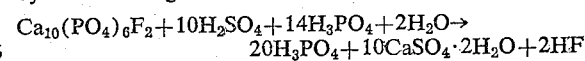

$$Ca_{10}(PO_4)_6F_2 + 10H_2SO_4 + 14H_3PO_4 + 2H_2O \rightarrow$$
$$20H_3PO_4 + 10CaSO_4 \cdot 2H_2O + 2HF$$

The following example is given to illustrate the present invention; the parts by weight and parts by volume bear the same relation to each other as do kilograms to litres, and the percentages are by weight.

*Example*

The process of this example was carried out in the apparatus illustrated in FIGURES 4, 5, 6 and 7 and described above.

The total reactor volume was 8500 parts by volume, and the ratios of volume of the first to the subsequent compartments was 2:1:1.

To the first compartment was added 2000 parts per hour of finely ground Morocco rock (about 50% passed a 100 BSS mesh sieve), and to the third compartment was added 1964 parts per hour of 98% sulphuric acid and 6884 parts of recycle wash liquor containing 22% $P_2O_5$ as phosphoric acid.

The recycle ratio was between 9:1 and 12:1, and the product was withdrawn from the third compartment at a rate of 10,000 parts per hour. The temperature of reaction was maintained at 76–78° C.

The product removed from the reaction contained 32% $P_2O_5$ (as phosphoric acid), 3% $SO_4$ and 33% solids. The conversion of $P_2O_5$ in the rock to phosphoric acid was 97%.

We claim:

1. A continuous process for the manufacture of phosphoric acid by the wet process from sulphuric acid and phosphate rock which comprises the steps of adding phosphate rock to the first zone of at least three zones communicating in series, at least two of said zones communicating with a draft tube provided with impeller means, adding sulphuric acid to a different zone in the series, circulating the reaction mixture with agitation through said zones, recirculating part of the reaction mixture from the last zone to the first zone in the series through said draft tube, withdrawing part of the reaction mixture from the last zone in the series, the holding time in the first zone being greater than the holding time in the subsequent zones.

2. A continuous process as claimed in claim 1 wherein the holding time in the first zone is 1.5 to 5 times the holding time in the subsequent zones.

3. A continuous process as claimed in claim 1 wherein the holding time in the first zone is double the holding time in the subsequent zones.

4. A continuous process for the manufacture of phosphoric acid by the wet process from sulphuric acid and phosphate rock which comprises the steps of adding phosphate rock and sulphuric acid to a reaction system comprising at least three zones communicating in series, at least two of said zones communicating with a draft tube provided with impeller means, and recirculating part of the reaction mixture from the last zone to the first zone in the series through said draft tube, and withdrawing part of the reaction mixture from the reaction system and recovering phosphoric acid therefrom.

5. The method of using an apparatus to produce phosphoric acid; said apparatus comprising a vessel divided into at least three separate compartments, a draft tube provided with impelling means, and communicating means between said compartments in series, said compartments being essentially separate from one another apart from the communicating means, and at least two of said compartments communicating with said draft tube; said method comprising the steps of adding phosphate rock to the first compartment of said vessel, adding sulphuric acid to a different compartment of said vessel, circulating the reaction mixture with agitation through said compartments, recirculating part of the reaction mixture from the last compartment to the first compartment in the said series through said draft tube, withdrawing part of the reaction mixture from the last compartment in the series, the holding time in the first compartment being greater than the holding time in the subsequent compartments.

References Cited in the file of this patent

UNITED STATES PATENTS

| | | |
|---|---|---|
| Re. 19,045 | Larsson | Jan. 16, 1934 |
| 1,037,464 | Freudenthal | Sept. 3, 1912 |
| 2,288,460 | Kane et al. | June 30, 1942 |
| 2,384,813 | Coleman | Sept. 18, 1945 |
| 2,577,856 | Nelson | Dec. 11, 1951 |
| 2,832,674 | Ranzenberger | Apr. 29, 1958 |
| 2,927,845 | Plunkett | Mar. 8, 1960 |
| 3,023,089 | Graves et al. | Feb. 27, 1962 |

FOREIGN PATENTS

| | | |
|---|---|---|
| 1,212,825 | France | Mar. 25, 1960 |